(12) United States Patent
Aftanas et al.

(10) Patent No.: US 8,251,267 B2
(45) Date of Patent: Aug. 28, 2012

(54) VEHICLE ARTICLE CARRIER HAVING SINGLE SIDED RELEASABLE AND STOWABLE CROSS BARS

(75) Inventors: Jeffrey M. Aftanas, Ortonville, MI (US); Gerard J. Kmita, Allen Park, MI (US); Donald R. Potter, Clarkston, MI (US); John M. Heuchert, Macomb, MI (US)

(73) Assignee: JAC Products, Inc., Saline, MI (US)

( * ) Notice: Subject to any disclaimer, the term of this patent is extended or adjusted under 35 U.S.C. 154(b) by 517 days.

(21) Appl. No.: 12/136,854

(22) Filed: Jun. 11, 2008

(65) Prior Publication Data

US 2008/0308590 A1 Dec. 18, 2008

Related U.S. Application Data

(60) Provisional application No. 60/934,491, filed on Jun. 13, 2007.

(51) Int. Cl.
  *B60R 9/00* (2006.01)
  *B60R 9/048* (2006.01)
(52) U.S. Cl. ........ 224/321; 224/315; 224/317; 224/324; 224/323; 224/325; 224/326; 224/331
(58) Field of Classification Search .............. 224/321, 224/315, 317, 324, 323, 322, 325, 326, 331
See application file for complete search history.

(56) References Cited

U.S. PATENT DOCUMENTS

| | | | |
|---|---|---|---|
| 4,416,406 A | 11/1983 | Popeney | |
| 4,473,178 A | 9/1984 | Bott | |
| 5,340,007 A | 8/1994 | Jeuffray et al. | |
| 5,377,890 A | 1/1995 | Brunner et al. | |
| 5,395,024 A | 3/1995 | Luchtenberg | |
| 5,511,709 A | 4/1996 | Fisch | |
| 6,112,964 A * | 9/2000 | Cucheran et al. | 224/321 |
| 6,286,739 B1 * | 9/2001 | Stapleton | 224/321 |
| 6,811,066 B2 | 11/2004 | Aftanas et al. | |
| 6,959,845 B2 | 11/2005 | Aftanas et al. | |
| 7,066,364 B2 | 6/2006 | Kmita et al. | |
| 7,090,103 B2 | 8/2006 | Aftanas et al. | |
| 7,441,679 B1 * | 10/2008 | Harberts et al. | 224/321 |
| 7,458,490 B2 * | 12/2008 | Klinkman et al. | 224/321 |
| 7,802,707 B2 * | 9/2010 | Aftanas | 224/321 |

* cited by examiner

*Primary Examiner* — Nathan J Newhouse
*Assistant Examiner* — Lester L Vanterpool
(74) *Attorney, Agent, or Firm* — Harness, Dickey & Pierce, P.L.C.

(57) ABSTRACT

A vehicle article carrier adapted to be mounted to an outer body surface of a motor vehicle. The carrier has a pair of cross bars that can each be stowed on corresponding pairs of support elements when the cross are not needed for use without the need to completely detach either of the cross bars from their associated support elements. A rear one of the cross bars has a single sided release feature that enables both end supports at opposite ends of the rear cross bar to be simultaneously unlocked or locked from a rear pair of support elements from either end support. The rear cross bar can also be slidably positioned along the rear pair of support elements to better configure the cross bars to support variously sized articles thereon.

13 Claims, 19 Drawing Sheets

VEHICLE ARTICLE CARRIER HAVING SINGLE SIDED RELEASABLE AND STOWABLE CROSS BARS

CROSS REFERENCE TO RELATED APPLICATION

The present application claims priority from U.S. provisional patent application Ser. No. 60/934,491, filed Jun. 13, 2007, the entire disclosure of which is hereby incorporated by reference into the present disclosure.

FIELD

The present disclosure relates to vehicle article carrier systems and methods, and more particularly to a vehicle article carrier system and method that includes a pair of cross bars that can be pivoted into stowed positions parallel to a pair of supporting rails when not needed, and where at least one of the cross bars has locking assemblies at opposite ends that can be simultaneously locked and unlocked from one end of the cross bar.

BACKGROUND

Vehicle article carriers are used in a variety of automotive applications to transport articles of various shapes and sizes above an outer body surface of a vehicle. Typically, a pair of elongated rails is secured to the outer body surface of the vehicle generally parallel to one another. One or more cross bars are then secured at opposite ends to the rails. Typically the cross bars are not stowable, meaning that even when the article carrier is not in use, the cross bars would be secured to the rails extending perpendicularly between the rails. Of course, if the cross bars are removable, then they could be removed entirely from the rails, but then this gives rise to the problem of storing the cross bars, as well as the inconvenience of having to physically disassemble the cross bars from the remainder of the vehicle article carrier. Often, external tools may be required for such disassembly, which further adds to the inconvenience for the user. Storage of such components within the vehicle can also be difficult and/or consume valuable and limited cargo space. Storing the cross bars separately from the vehicle may give rise to the inconvenient situation where a need arises to use the vehicle article carrier, while the user is away from home or work with the vehicle, but the cross bars are being stored at home or at a place of work.

If the cross bar is of the type that can be adjustably positioned on the rails, then it will typically have a locking mechanism at each end thereof. The locking mechanisms are used to secure the cross bar to the rails. Adjusting the positioning of the cross bar on the rails typically involves unlocking a first end support of the cross bar, then walking around to the other side of the vehicle and unlocking a second end support at the opposite end of the cross bar. Then the cross bar is moved to the desired position, and then the second end support would be locked. The user would then walk around to the opposite side of the vehicle and lock the end support at the first end. As will be appreciated, this process can be somewhat cumbersome for those individuals that use their article carrier systems frequently.

SUMMARY

The present system and method is directed to a vehicle article carrier having a pair of cross bars that may be stowed on associated pairs of fixedly secured support elements when the cross bars are not needed for use. Advantageously, there is no need to disassemble either of the cross bars from the support elements, nor are any special tools required for a user to move the cross bars between their stowed and operative positions. In addition, one of the cross bars may be positioned at a plurality of different longitudinal positions along a designated pair of the support elements.

In one specific implementation at least one of the cross bars has a single sided release locking mechanism that enables end supports at both ends of the cross bar to be simultaneously released from locking engagement with a designated pair of the support elements when a user actuates a locking mechanism at one end of the cross bar. Thus, this avoids the need for the user to first unlock a first end support, and then walk around the vehicle to the other side to perform the same action at a second end support of the cross bar, and then to repeat these operations to lock both end supports from their respective support elements.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
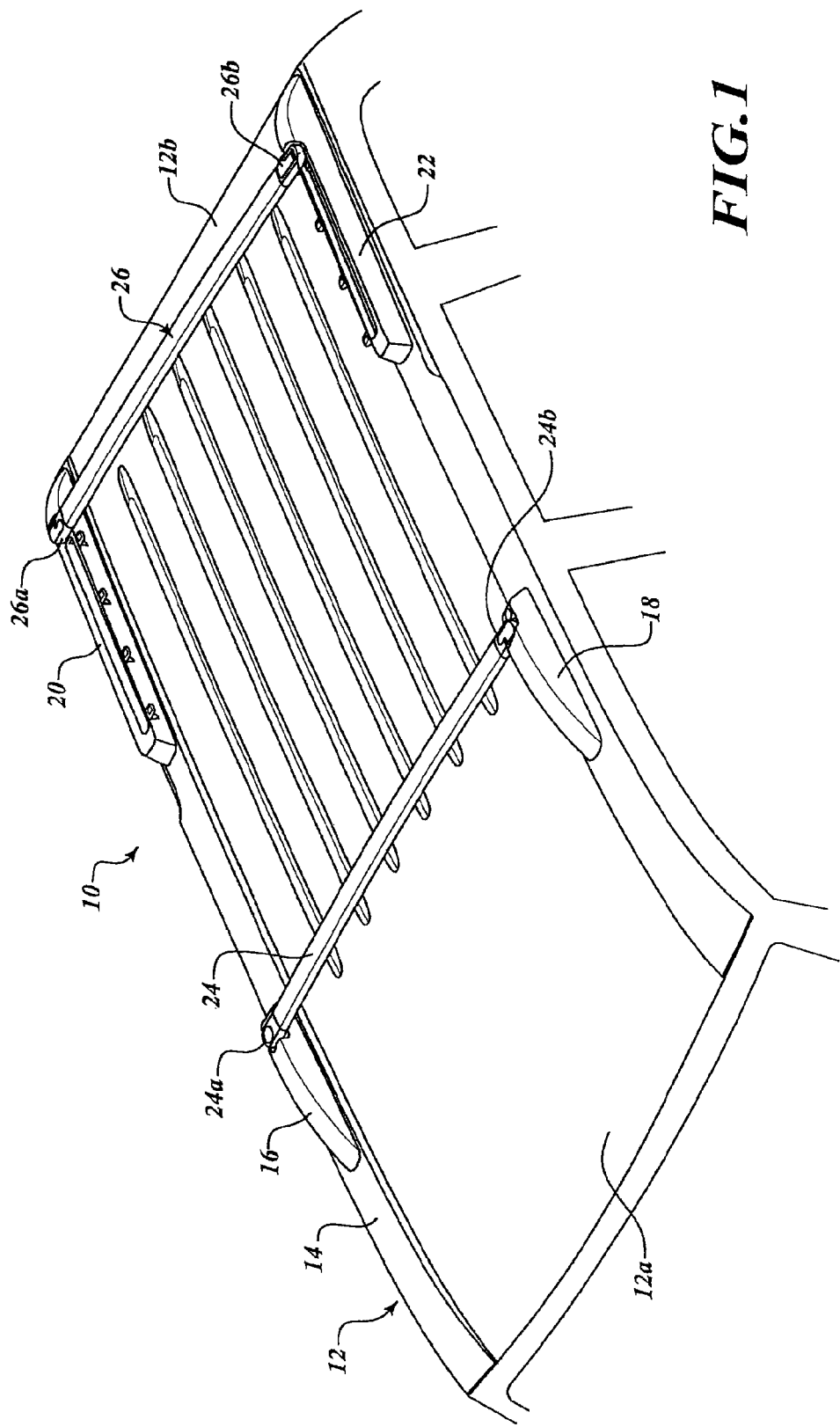
FIG. 1 is a perspective view of a vehicle article carrier of the present disclosure mounted on a roof portion of a motor vehicle, with a pair of cross bars of the carrier in their operable (i.e., non-stowed) positions.
Figure 2:
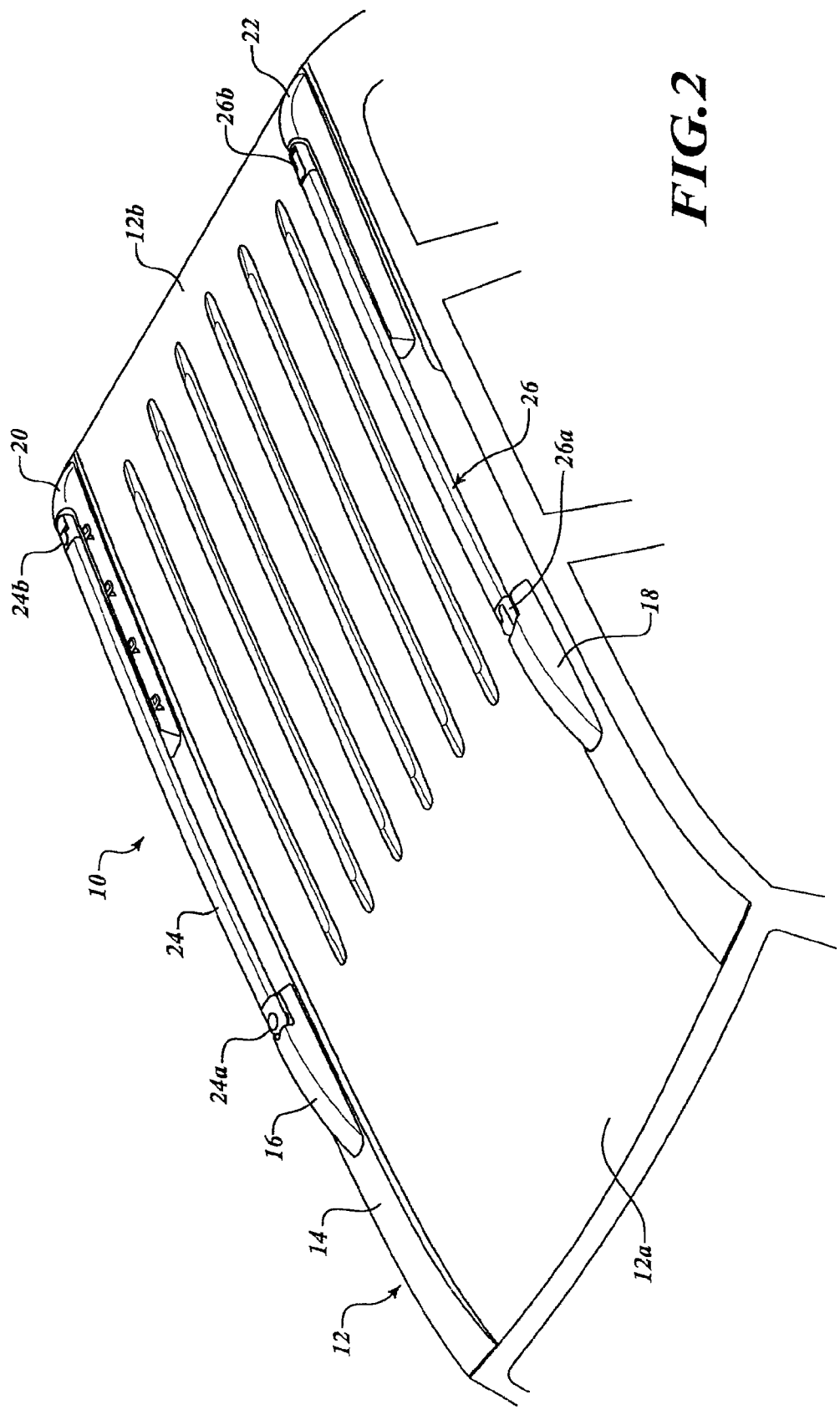
FIG. 2 is a perspective view of the vehicle article carrier of FIG. 1 but with the two cross bars in their stowed positions.
Figure 3:
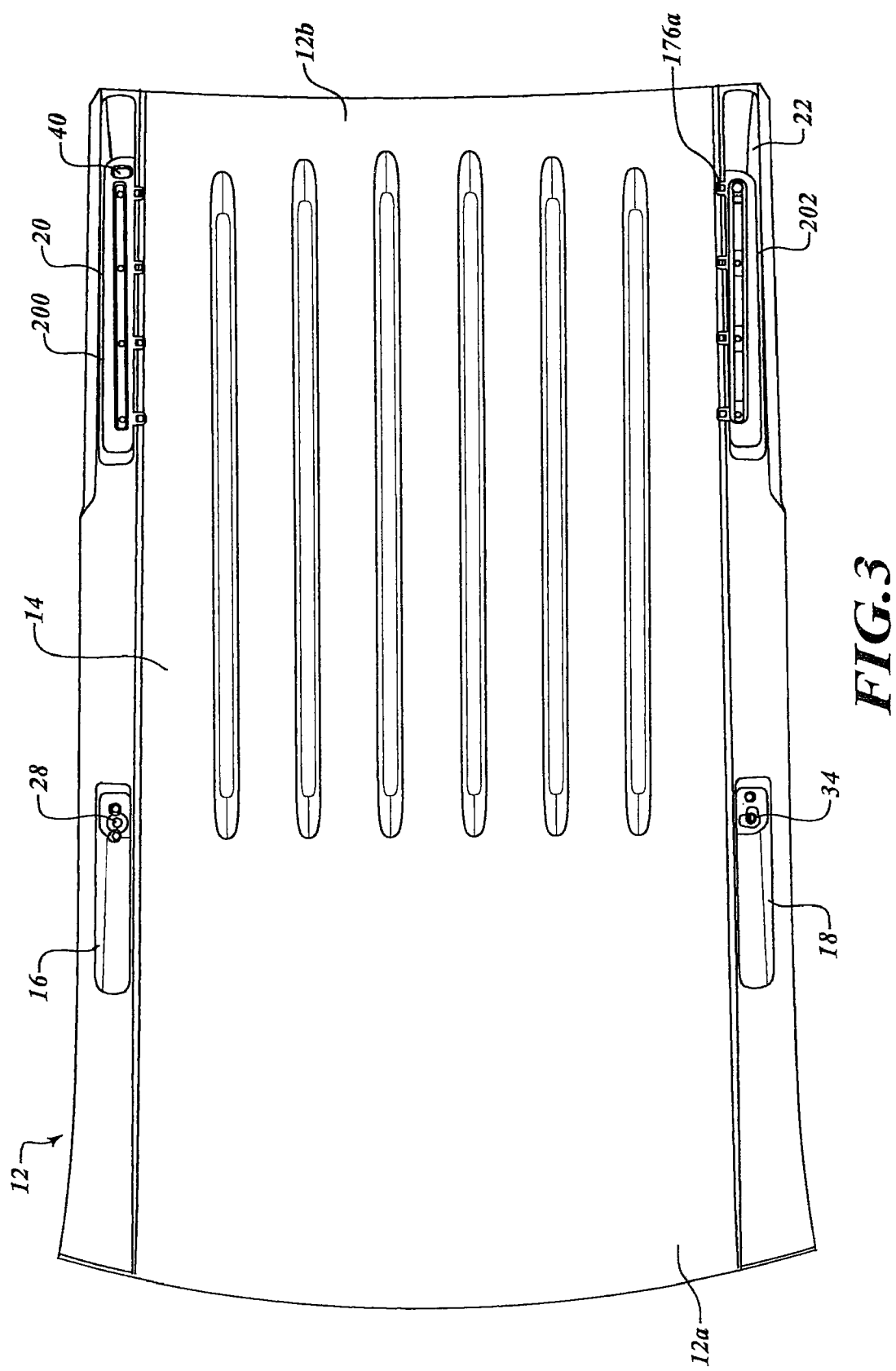
FIG. 3 is a top plan view of the vehicle article carrier but without the cross bars positioned thereon.

Referring to FIGS. 1-3, there is shown a vehicle article carrier apparatus 10 mounted on an outer body surface 14 of a motor vehicle 12. The apparatus 10 generally includes first and second forward support elements 16 and 18, respectively, and first and second rear support elements 20 and 22, respectively. In a first (i.e., "operative") configuration, a forward cross bar 24 is supported from the forward support elements 16,18 and a rear cross bar 26 is supported from the rear support elements 20,22. In a second (i.e., "stowed") configuration, the forward cross bar 24 is supported from the support elements 16 and 20 while the rear cross bar 26 is supported from support elements 18 and 22. In the stowed configuration shown in FIG. 2, the cross bars 24,26 are advantageously positioned to minimize aerodynamic drag.

Figure 4:
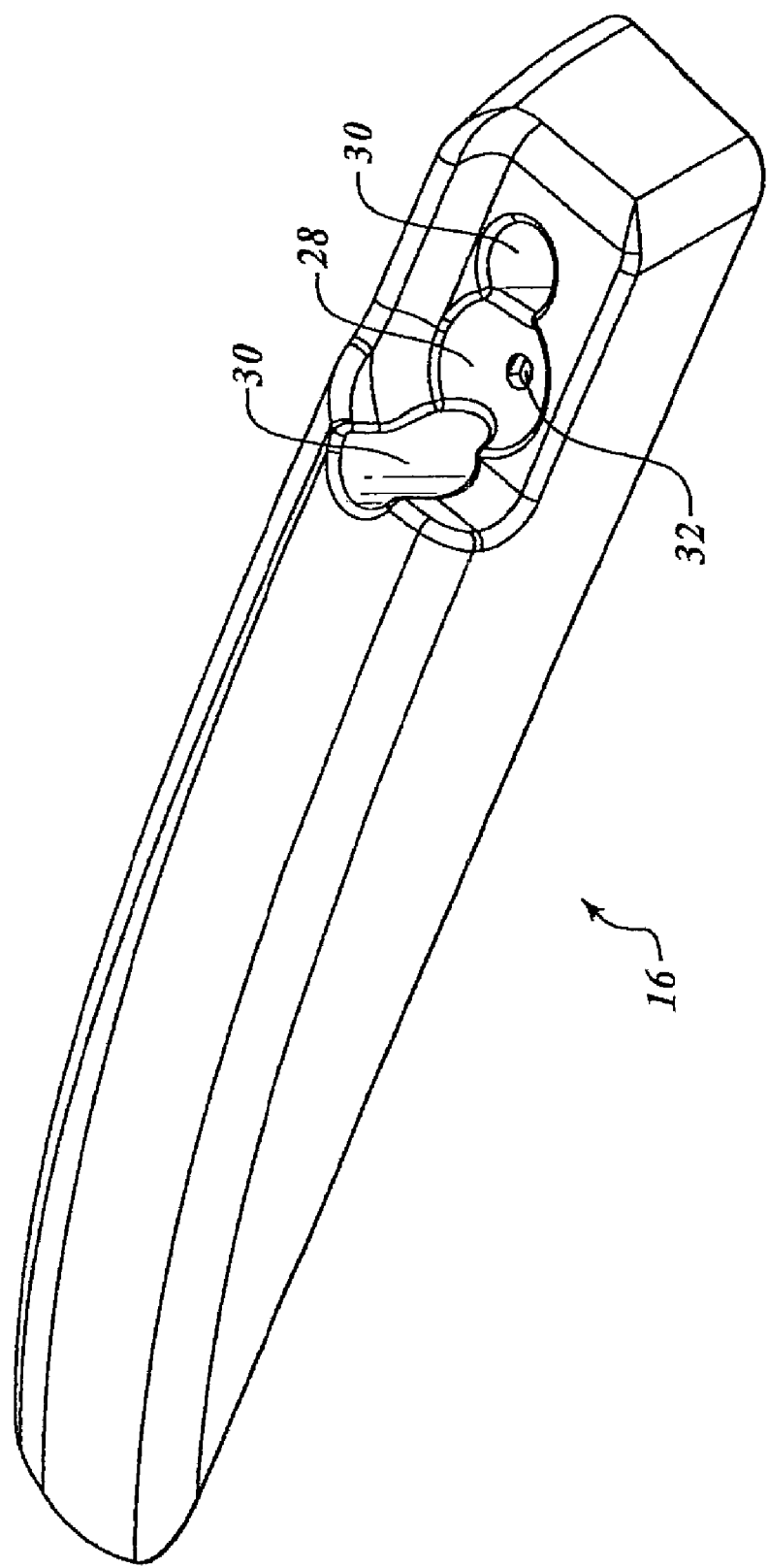
FIG. 4 is an enlarged perspective view of a first one of the forward support elements.

With further reference to FIGS. 3 and 4, the first forward support element 16 includes a partial spherical recess 28 and a pair of holes 30. The recess 28 is used to mount a first end support 24a of the forward cross bar 24 for pivoting movement as will be described further in the following paragraphs. The holes 30 enable external fastening elements to be used to secure a bracket (not shown) to the outer body surface 14 underneath the support element 16, which also enables the support element 16 to be fixedly secured to the outer body surface 14. The recess 28 also has a hole 32 that facilitates mounting of the end support 24a thereto, as will be described in more detail in the following paragraphs.

Figure 5:
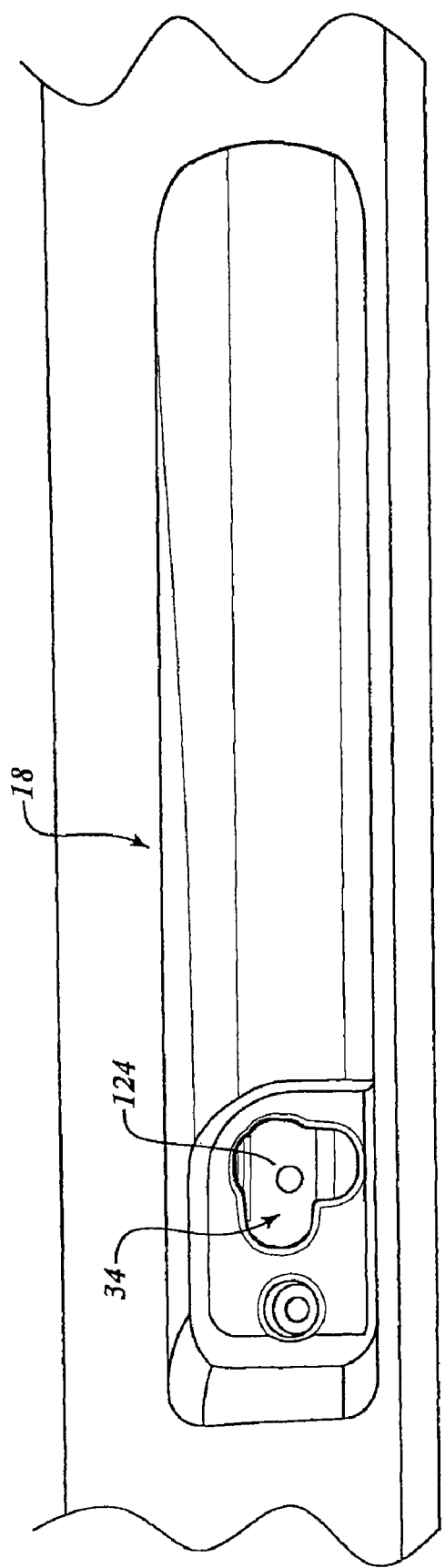
FIG. 5 is an enlarged plan view of a second one of the forward support elements.

FIGS. 3 and 5 illustrate in greater detail the second forward support element 18. Support element 18 includes an opening 34 that enables either a second end support 24b of the forward cross bar 24 or a first end support 26a of the rear cross bar 26 to be secured thereto.

Figure 6:
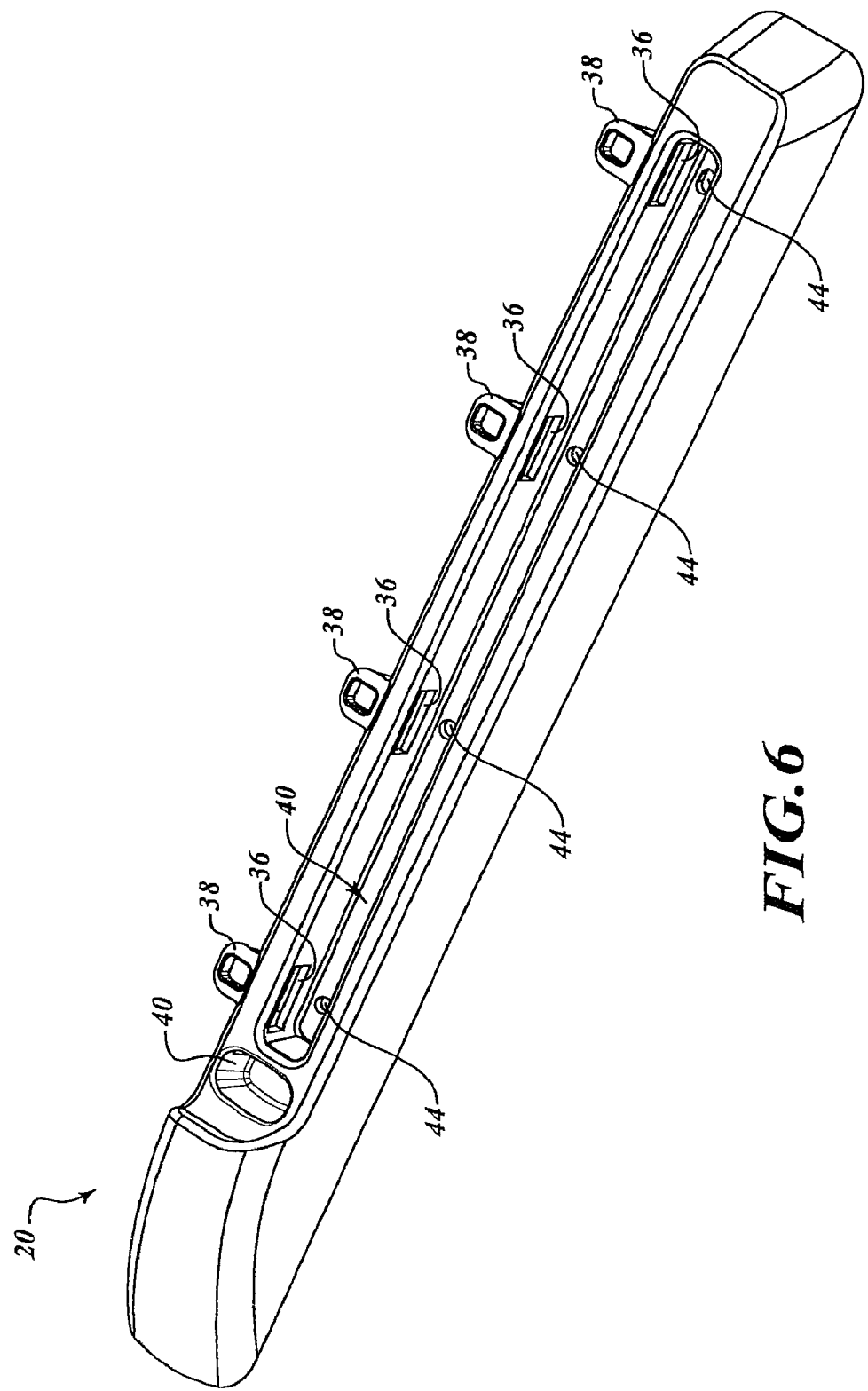
FIG. 6 is an enlarged perspective view of a first one of the rear support elements.

FIGS. 3 and 6 illustrate the first rear support element 20 in greater detail. The support element 20 includes a plurality of spaced apart slots 36 each having a securing loop 38 aligned therewith. Any one of slots 36 may be used to facilitate engagement of the end support 26a of the rear cross bar 26 with the support element 20 when the rear cross bar 26 is in its operative position. This also enables adjustable positioning of the rear cross bar 26 along the rear support elements 20 and 22. An opening 40 permits the end support 24b of the forward cross bar 24 to engage the support element 20 when the forward cross bar 24 is in its stowed position. A channel 42 allows sliding movement of the end support 26a therealong when the rear cross bar 26 is being re-positioned. Holes 44 in a bottom wall 42 nable external securing elements (not shown), for example RIVNUT® fasteners, to be used to secure the support element 20 to the outer body surface 14 of the vehicle 12.

Figure 7:
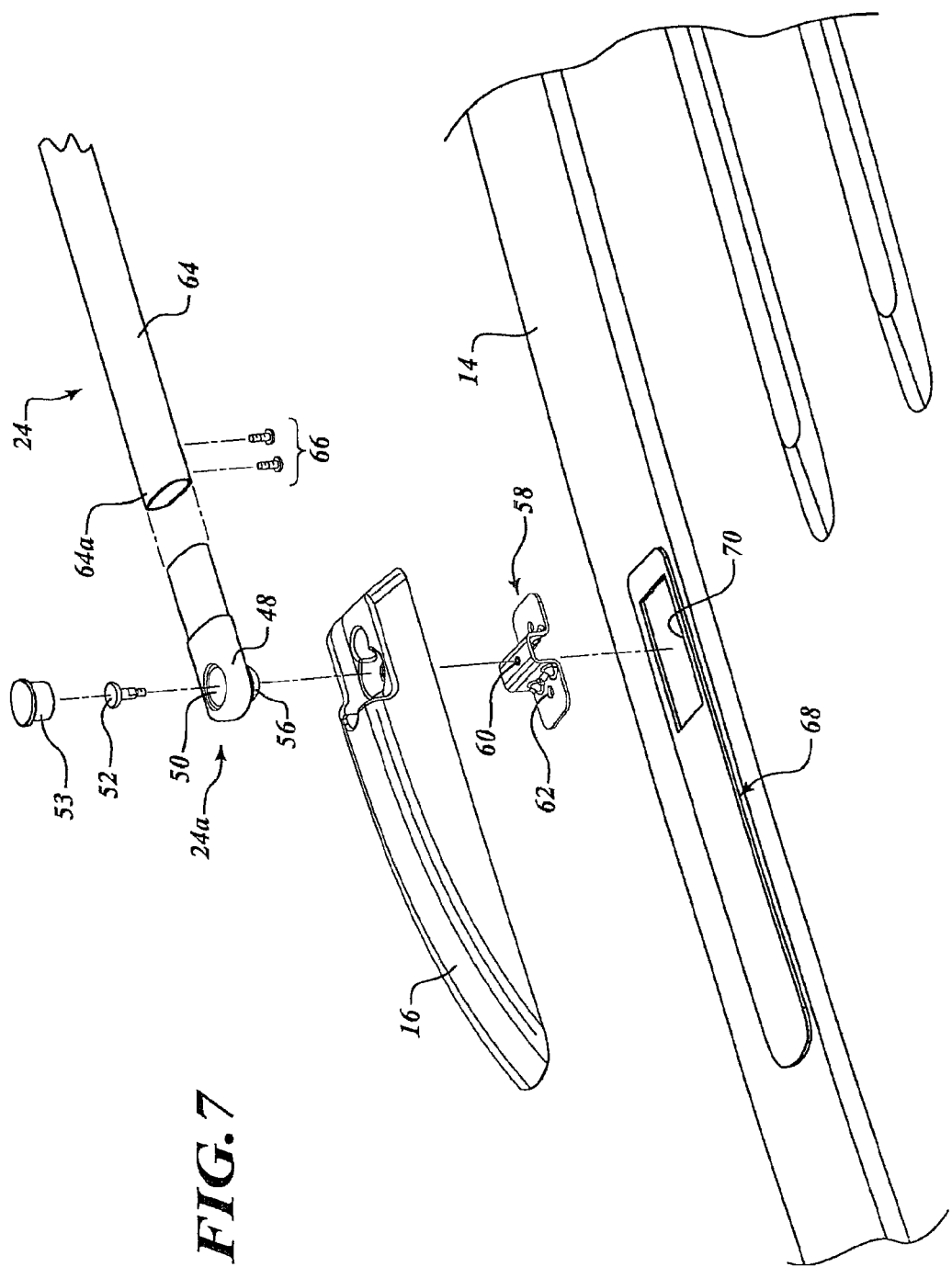
FIG. 7 is an exploded perspective view of the components at a first end of the forward cross bar.

Referring to FIG. 7, the construction of end support 24a of the forward cross bar 24 is shown. The end support 24a includes an end support component 48 having a hole 50 through which a fastener 52 can be inserted. A spherical portion 54 is integrally formed with the end support component 48 and includes a slot 56 which enables the forward cross bar 24 to be lifted away from support element 18 at end support 24b. The spherical portion 54 also enables pivoting movement of the forward cross bar 24 about the fastener 52. The fastener 52 is secured to a bracket 58 through an opening 60 such that it cannot be readily removed from the bracket 58 once the end support 24a is assembled to the support element 16. The bracket 58 may be held to the outer body surface of the vehicle 12 with a pair of fastening elements, for example RIVNUT® fasteners (not shown), that extend through holes 62 in a pair of flanges of the bracket 58. The bracket 58, being fixedly secured to the outer body surface 14, provides a structurally strong point of attachment for the end support 24a. A cap 53 may be used to provide a decorative covering for the hole 50.

The end support component 48 may be secured to a first end 64a of a cross bar component 64 of the forward cross bar 24. In this regard it will be appreciated the cross bar component 64 forms a tubular component that is preferably made from a structurally strong material, for example extruded or roll formed aluminum. Fastening elements 66 may extend through holes (not shown) in the first end 64a to engage openings (not shown) in the end support component 48 so that the end support component 48 is fixedly secured to the cross bar component 64.

With further reference to FIG. 7, support element 16 may be positioned over a mounting pad 68 placed on the outer body surface 14 of the vehicle 12. The mounting pad 68 may be made from rubber or any other suitable material that is able to protect the outer body surface 14 against scratching or marring during installation of the support element 16 thereto. An opening 70 provides clearance for the bracket 58.

Figure 8:
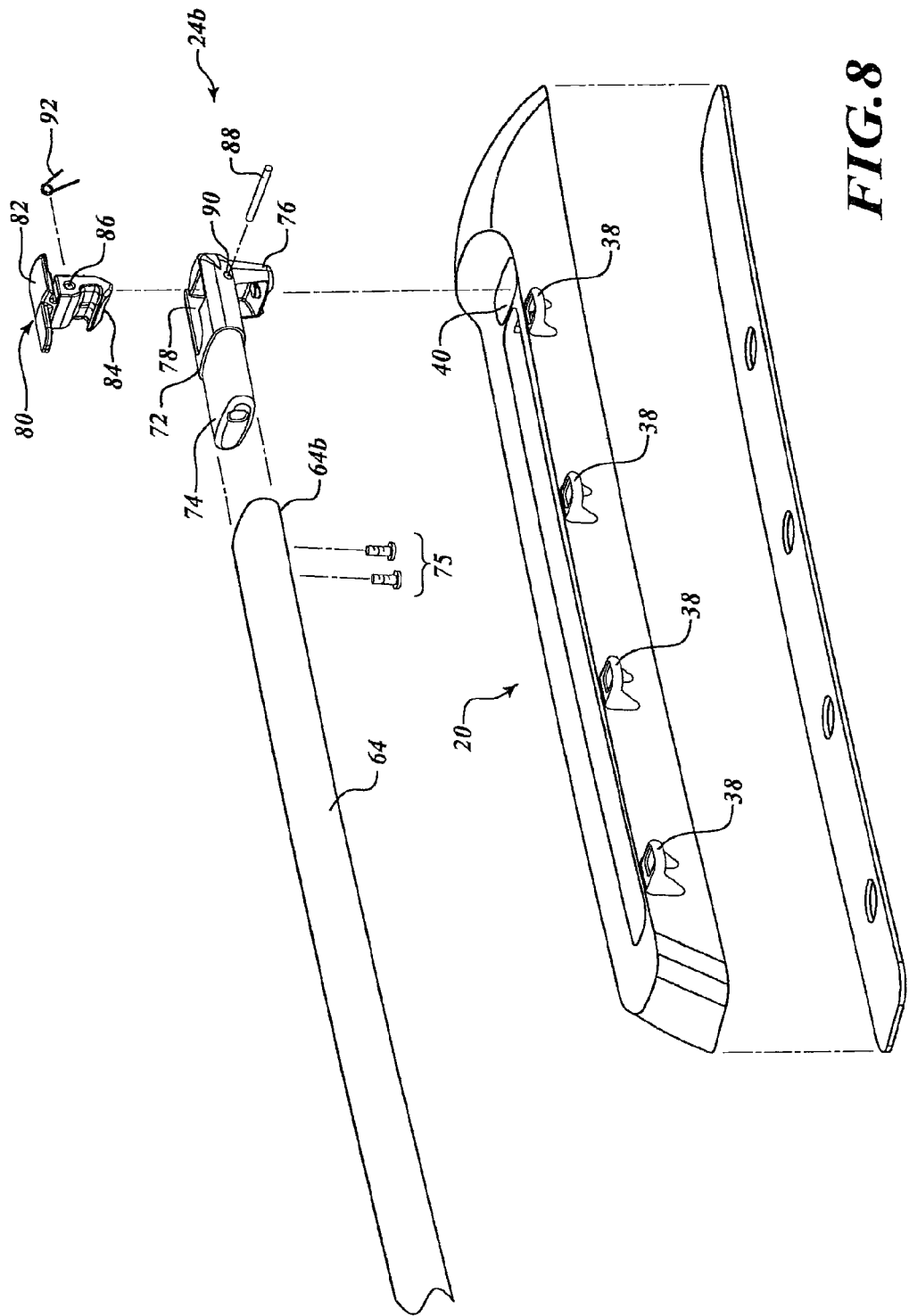
FIG. 8 is an exploded perspective view of the components at the second end of the forward cross bar, in addition to the first one of the rear support elements.

Referring to FIG. 8, the construction of the second end support 24b of the forward cross bar 24 is shown in greater detail. End support 24b includes an end support component 72 having a neck portion 74 and a base portion 76. The neck portion 74 may be inserted into an end 64b of the cross bar component 64 of the forward cross bar 24 and then secured via one or more conventional fastening elements 75 that extend through holes (not shown) at end 64b, and through holes (not shown) in neck portion 74. FIG. 8 also illustrates a pad 77 having a plurality of holes 77a that may be interposed between the support element 20 and the outer body surface 12a. The holes 77a enables fastening elements (not shown) to extend therethrough, and through openings in the support element 20, to secure the support element fixedly to the outer body surface 12a.

The base portion 76 of the end support component 72 has an opening 78 that receives a locking member 80 therein. The locking member 80 includes a manually graspable portion 82 and a jaw portion 84. A bore 86 receives a pivot pin 88, which also extends through a bore 90 in the end support component 72. In this manner the locking member 80 is pivotally supported within the opening 78 of the end support component 72.

Figure 9:
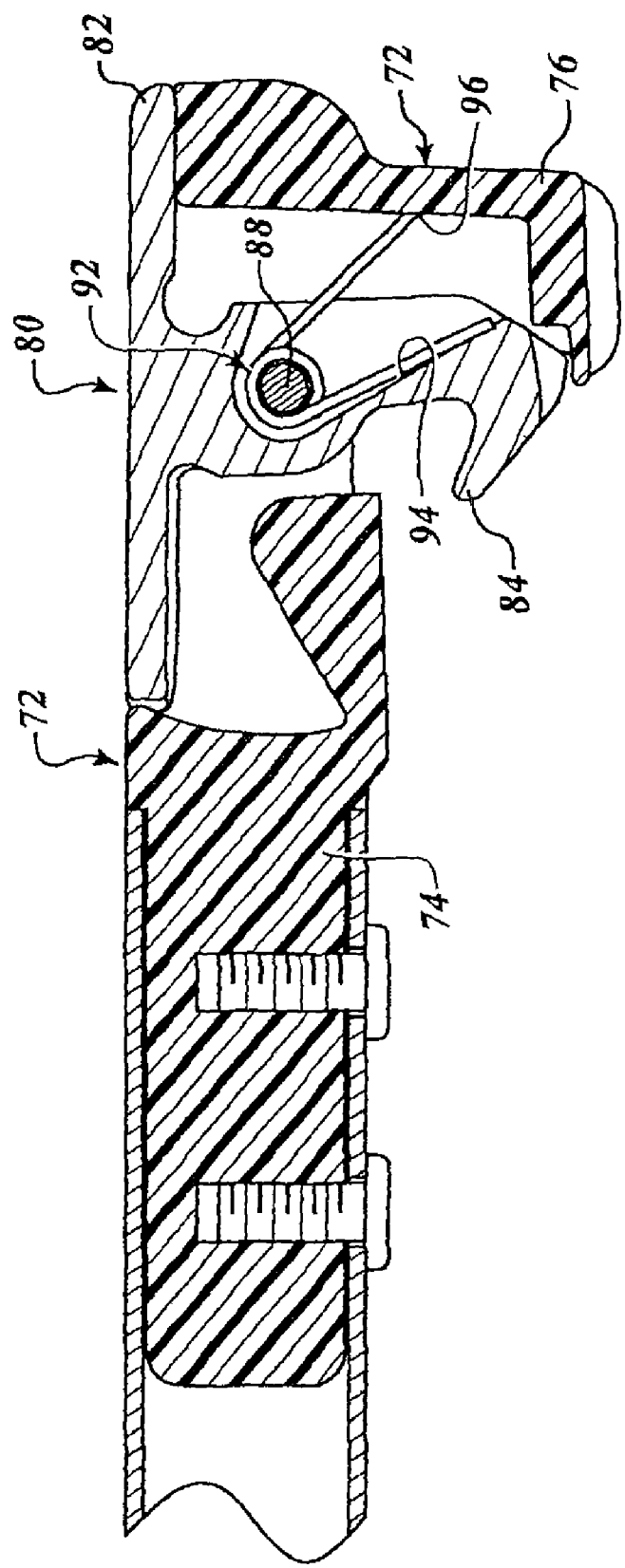
FIG. 9 is a cross sectional side view illustrating the mounting of the locking member within the end support component of the end support shown in FIG. 8.
Figure 17:
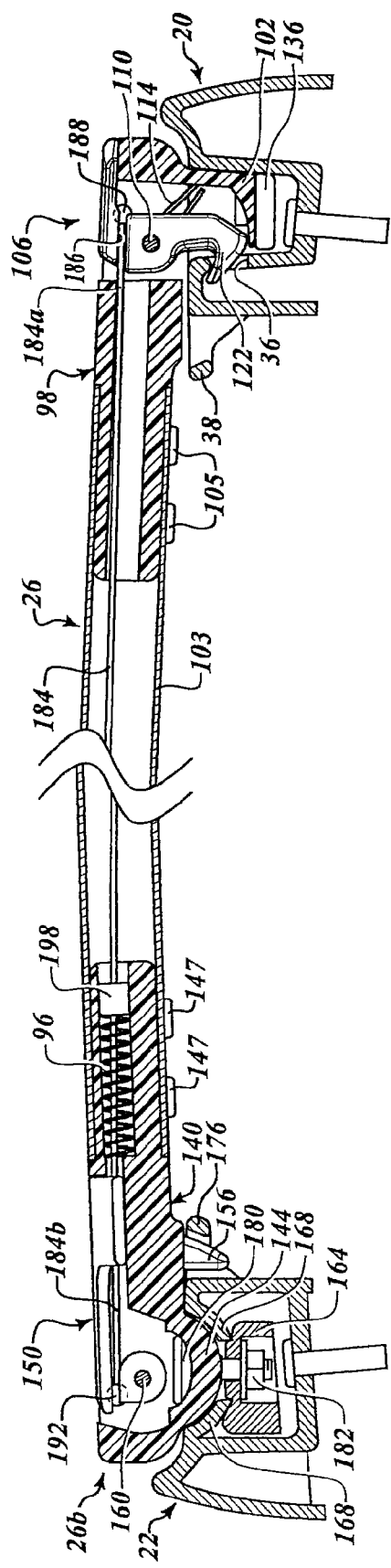
FIG. 17 is a view of the cross bar and support elements shown in FIG. 16 but with the locking members in their locked positions.

With brief reference to FIG. 9, a biasing element 92 is positioned over the pivot pin 88 and engages a surface 94 of the locking member 80 and an inner wall surface 96 of the end support component 72. The biasing element 92 operates to bias the jaw portion 84 of the locking member 80 into a locked normally locked position as shown in FIG. 17. In the stowed position, the jaw portion 84 engages the opening 40 in the support element 20.

Figure 10:
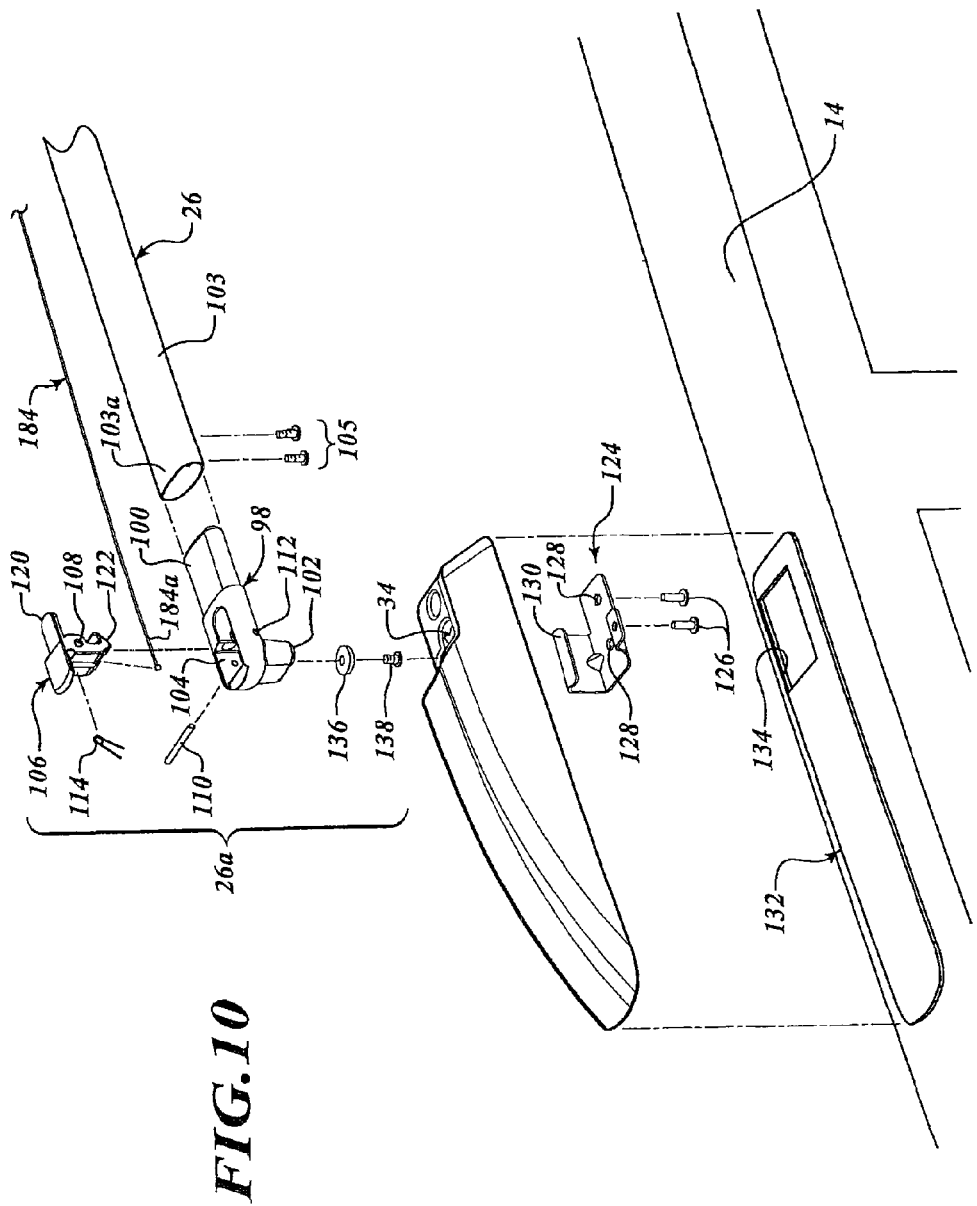
FIG. 10 is an exploded perspective view of the components at the first end of the rear cross bar.

With reference to FIG. 10, first end support 26a of the rear cross bar 26 is shown in greater detail. The first end support 26a includes an end support component 98 having a neck portion 100 and a base portion 102. The neck portion 100 may be inserted into an end 103a of a tubular cross bar component 103 and secured thereto via a plurality of conventional threaded fastening elements 105. The fastening elements 105 may extend through holes (not shown) in the cross bar component 103 and into threaded bores in the neck portion 100 of the end support component 98.

Figure 11:
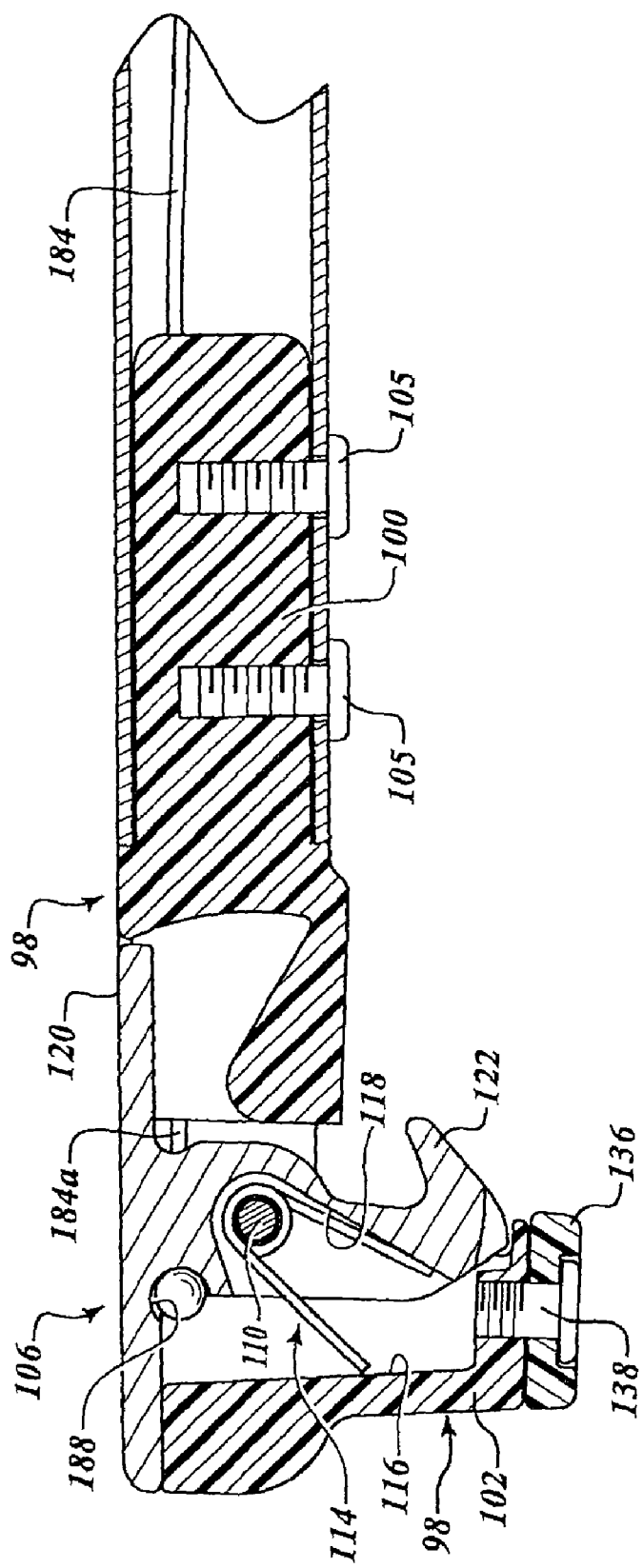
FIG. 11 is a cross sectional side view of the locking member mounted within the end support component of the end support shown in FIG. 10.

The base portion 102 of the end support component 98 includes an opening 104 within which is positioned a locking member 106. The locking member 106 includes a bore 108 that receives a pivot pin 110, with the pivot pin also extending through a bore 112 in the base portion 102 so that the locking member 106 is pivotally supported within the opening 104. With reference to FIG. 11, a biasing element 114 in the form of a torsion spring is positioned over the pivot pin 110 during assembly such that one leg abuts a surface 116 of the end support component 98 while the other leg of the biasing element 114 abuts an internal wall surface 118 of the locking member 106. This serves to continuously bias the locking member 106 into a normally locked position as shown in FIG. 17.

With further reference to FIGS. 10 and 11, the locking member 106 also includes a manually graspable portion 120 and a jaw portion 122. The user may grasp the manually graspable portion 120 to urge the locking member 106 into an unlocked position, to thus permit the end support 26a to be disengaged from the support element to which it is attached (i.e., either support element 18 or support element 20). The jaw portion 122 serves to lock the end support 26a to either one of the support elements 18 or 20.

With further reference to FIG. 10, a bracket 124 is positioned within the opening 34 and secured to the outer body surface 14 by a pair of conventional fastening elements 126 that extend through holes 128 in the bracket 124. The fastening elements 126 may be RIVNUT® fasteners or any other suitable fastening members. The bracket includes a lip 130 that the jaw portion 84 of the end support 24b can engage when the forward cross bar 24 is in its operative position and locked to the support element 18. A protective pad 132 is positioned on the outer body surface 14 to protect the surface. A cut-out 134 provides clearance for the bracket 124. The end support component 98 further includes a wheel 136 held to the base portion 102 by a threaded fastener 138 that engages a hole (not shown) in the base portion 102. The wheel 136 is able to rotate to help facilitate smooth sliding movement of the rear cross bar 26 when the end support 26a is engaged within the channel 42 of the rear support element 20.

Figure 12:
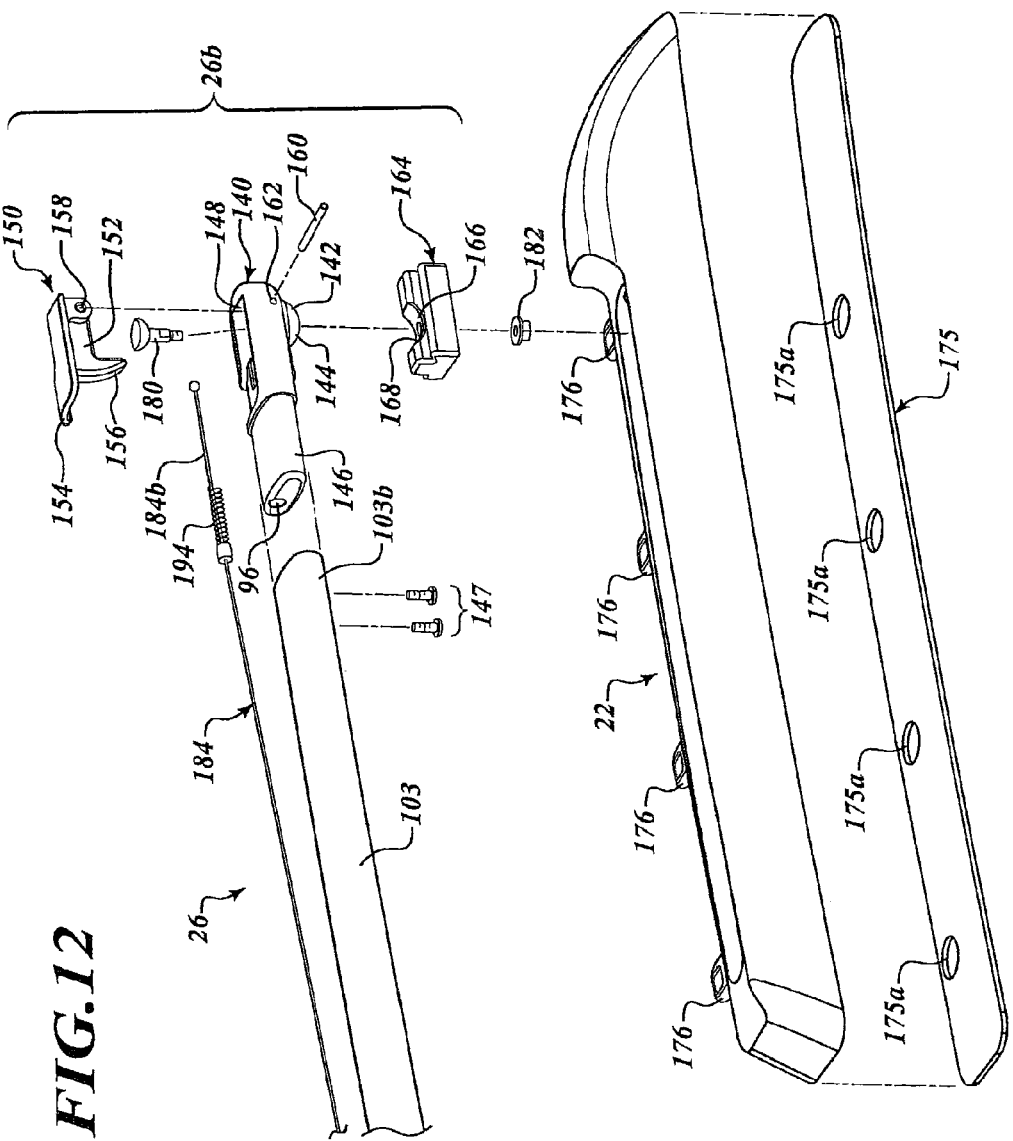
FIG. 12 is an exploded perspective view of the components at the second end of the rear cross bar and the second rear support element.

Referring now to FIG. 12, the construction of the end support 26b is shown in greater detail. The end support 26b includes an end support component 140 having a base portion 142, a spherical portion 144 and a neck portion 146. During assembly the neck portion 146 is inserted into an end 103b of the cross bar component 103. Conventional threaded fasteners 147 are inserted through holes in the cross bar component 103 and into threaded holes (not shown) in the end support component 140 to hold the end support component 140 securely to the cross bar component 103.

The end support 26b also includes an opening 148 within which a locking member 150 is positioned. The locking member 150 has a base portion 152, a manually graspable portion 154 and a jaw portion 156. The base portion 152 further includes a bore 158 through which a pivot pin 160 may be inserted. The pivot pin 160 also is inserted through a bore 162 in the end support component 140. Thus, the pivot pin 160 enables pivoting movement of the locking member 150 within the end support component 140.

With reference to FIGS. 12, 14, 15 and 16, the end support member 140 is also secured for pivoting movement by a mounting block 164 that is positioned within a channel 166 formed in the support element 22. The channel 166 has semi-circular wall portions 168 that help to support the spherical portion 144 of the end support component 140 when the end support component 140 is assembled thereto. Openings 170 allow the mounting block 164 to be inserted into the channel 166. The support element 22 includes a plurality of bottom wall portions 172 (FIG. 14) that each have a hole 174 therein. Conventional fasteners, for example RIVNUT® fasteners, may be inserted through the holes 174 when fastening the support element 22 to the outer body surface 14 of the vehicle 12. Securing loops 176 enable the jaw portion 156 of the locking member 150 to be engaged therein to secure the rear cross bar 26 against longitudinal movement when it is in its operative configuration. A rubber mounting pad 175 or other suitable protective form of pad may be disposed between the support element 22 and the outer body surface. Holes 175a permit fasteners, such as RIVNUT® fasteners, to extend through the mounting pad 175.

Figure 13:
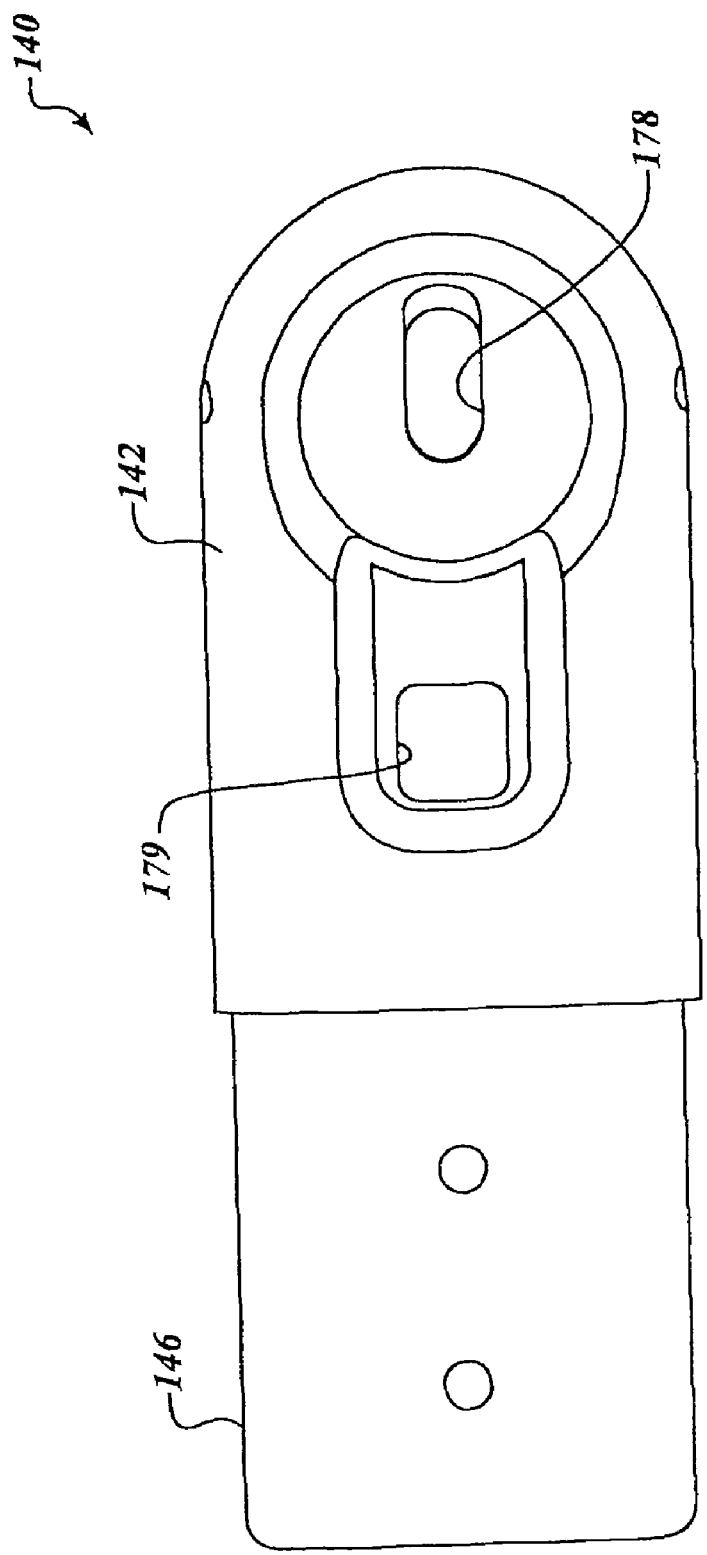
FIG. 13 is a bottom view of the end support component shown in FIG. 12.

With reference to FIGS. 12 and 13, the end support component 140 also includes a slot 178 that receives a partially threaded shaft of a retaining member 180. An opening 179 allows the jaw portion 156 of the locking member 150 to project therethrough. A fastener 182, either being threaded or press fit on to the shaft of the retaining member 180, secures the end support component 140 to the mounting block 164 after the mounting block 164 has been positioned within the channel 166 of the support element 22. The slot 178, together with engagement of the spherical surface 144 and the mounting surface 166, permits the rear cross bar 26b to be lifted at end support 26a as well as pivoted between its stowed and operative positions. The use of the slot 178 is highly advantageous because it enables the end support 26a to be lifted and lowered as the end support 26a is coupled to, or de-coupled from, either of the support elements 18 or 20, and thus eliminates any clearance issues that would otherwise exist when moving the end support 26a between the two support elements 18 and 20.

Figure 14:
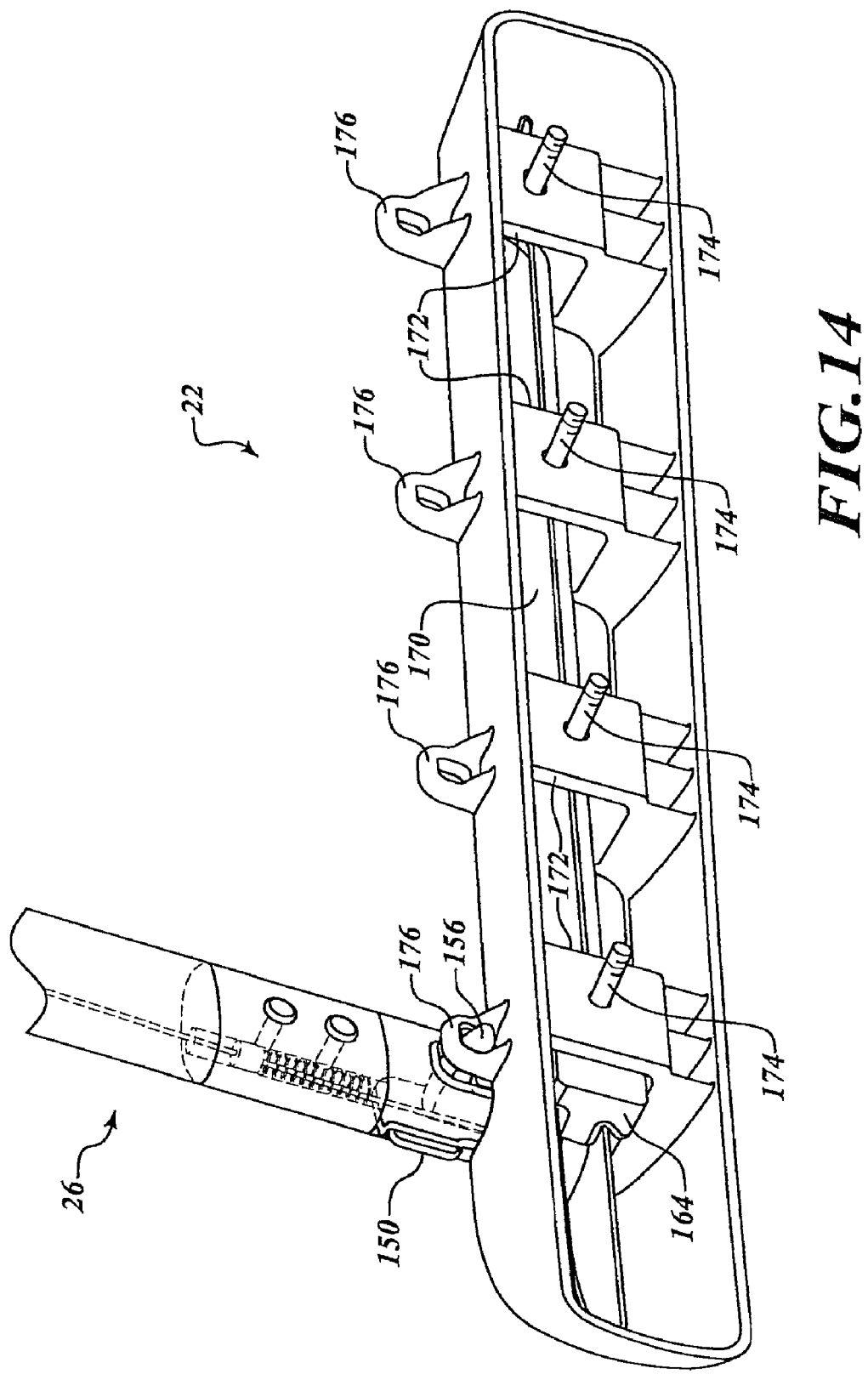
FIG. 14 is a bottom perspective view of the second end of the rear cross bar engaged with the second rear support element.
Figure 15:
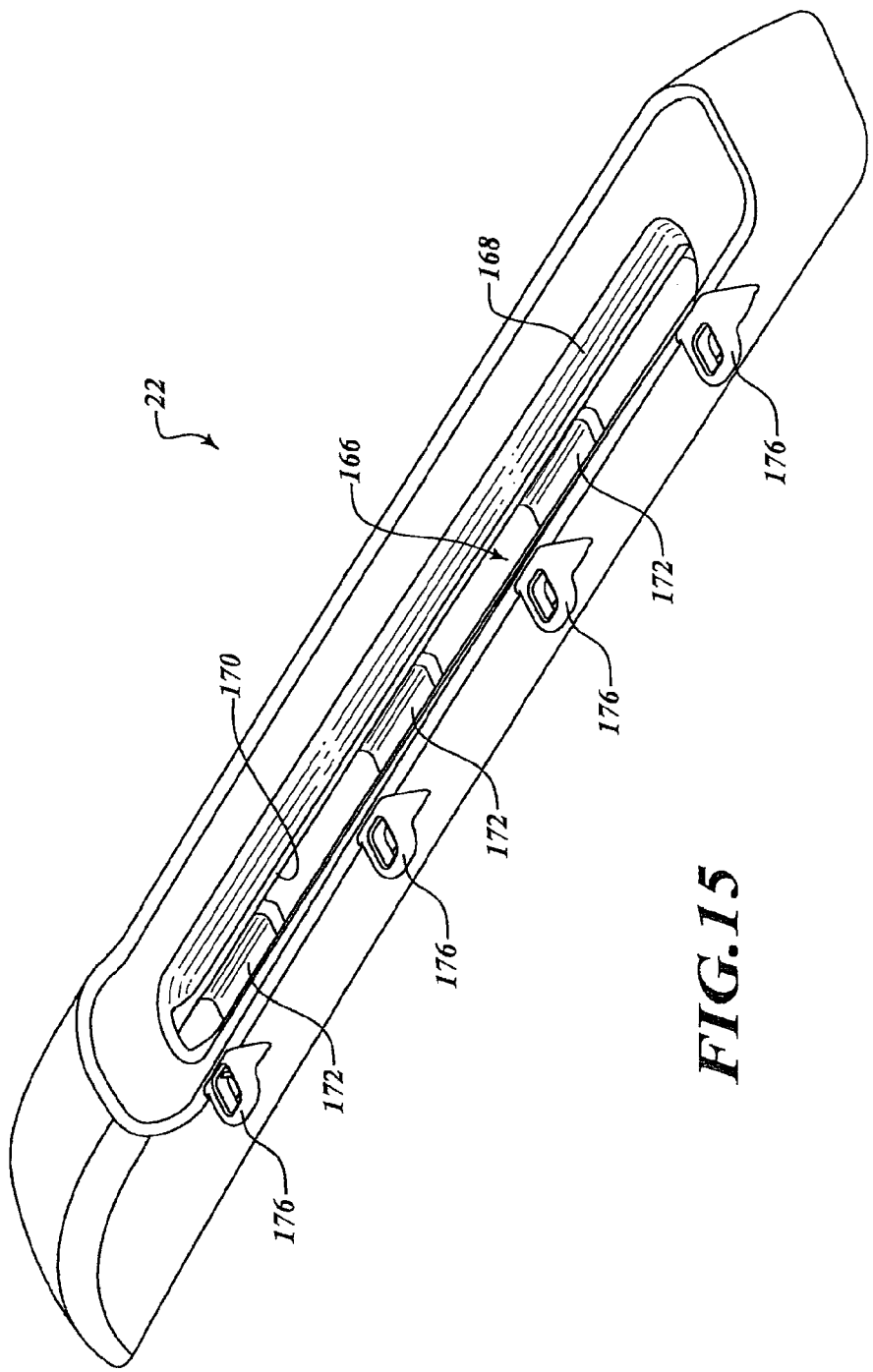
FIG. 15 is an enlarged perspective view of the second rear support element.
Figure 16:
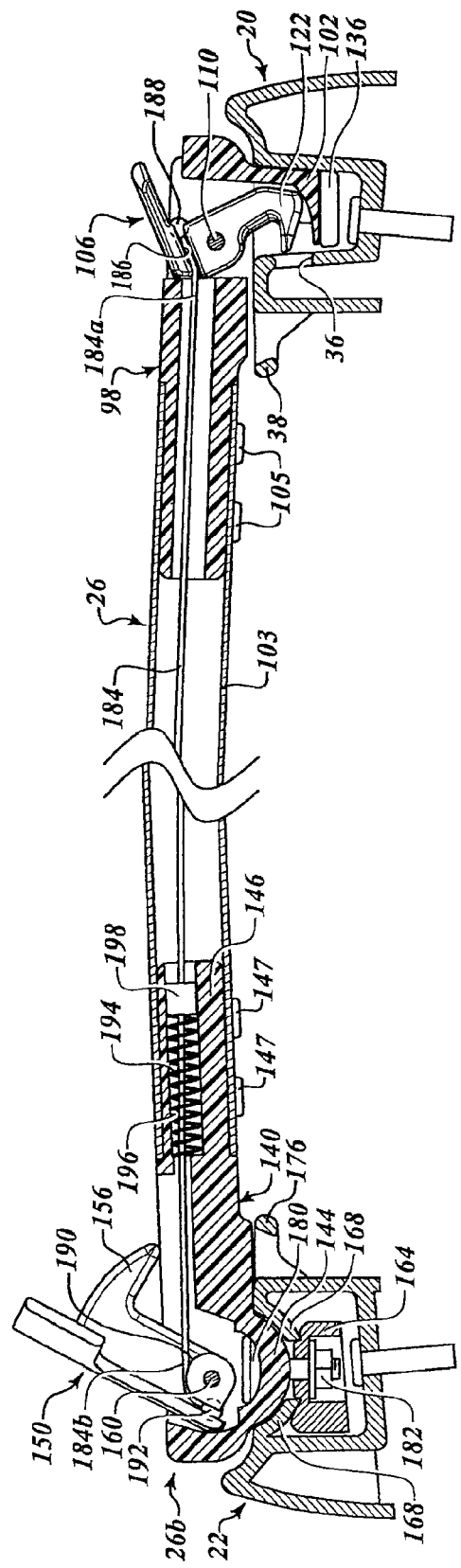
FIG. 16 is a cross sectional side view of the rear cross bar and the two rear support elements, with the locking members of the rear cross bar in their unlocked positions.

With further reference to FIGS. 14-16, the mounting block 164 is dimensioned such that it is able to slide within the channel 166 of the support element 22 without requiring any detachment of the rear cross bar 26 from the support element 22. Thus, the rear cross bar 26 can with be moved longitudinally and re-positioned along the rear support elements 20 and 22 if needed. In this example, the securing loops 38 and 176 define four distinct longitudinal positions at which the rear cross bar 26 can be secured.

Referring further now to FIGS. 10, 12, 16 and 17, a cable 184 has a first end 184a secured to the locking member 106 of end support 26a. The cable 184 may be made from steel or possibly from nylon or other suitably strong materials. The first end 184a is supported within a channel 186 in the locking member 106, and an enlarged head portion 188 of the cable 184 prevents the cable from being withdrawn from the locking member 106. Second end portion 184b of the cable 184 extends over an arcuate shoulder 190 in the locking member 150, and an enlarged head portion 192 prevents the cable 184 from being withdrawn from the locking member 150. A biasing element in the form of a coil spring 194 is positioned within a blind bore 196 in the neck portion 146 of the end support component 140. The biasing element 194 abuts a block 198 (FIGS. 16 and 17) that is crimped on or otherwise fixedly secured to the cable 184 so that it can exert tension on the cable that serves to help maintain the locking members 106 and 140 in their normally locked positions (FIG. 16).

Figure 19:
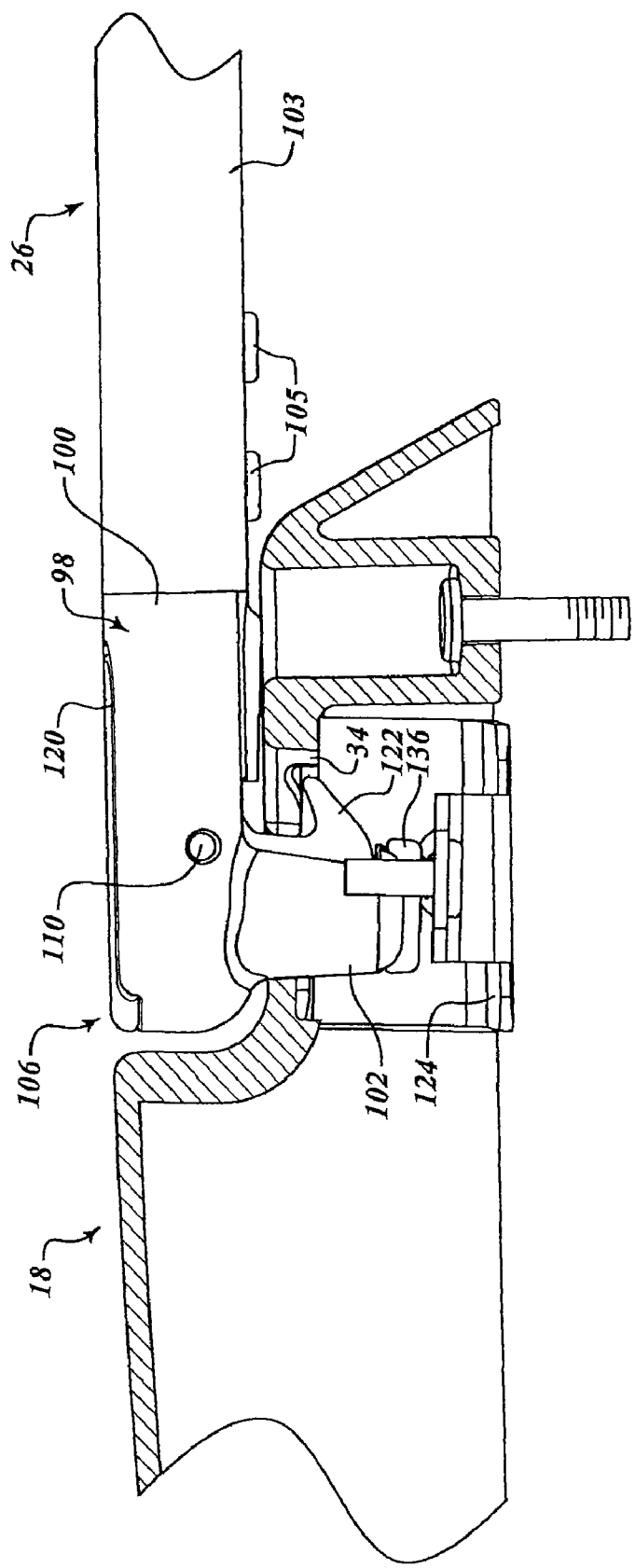
FIG. 19 is a side partial cross sectional view of the first end support of the rear cross bar engaged with the second one of the forward support elements.

Referring further to FIGS. 16 and 17, when the rear cross bar 26 is to be moved between its operative and stowed configurations, or when it is to be repositioned longitudinally along the two rear support elements 20 and 22, a user may manually grasp the manually engageable portion 120 or 154 of either of locking members 106 and 150, respectively, and lift upwardly away from its associated end support component 98 or 140, respectively. Cable 184 simultaneously causes pivoting of the other one of the locking members 106 or 150 into an unlocked position. While holding the selected locking member 106 or 150 in a lifted position, such as shown in FIG. 16, the entire rear cross bar 26 can be moved slidably along the rear support elements 20 and 22 to a new position defined by a different pair of the securing loops 38 and 176. Alternatively, the rear cross bar 26 could be pivoted from its operative position to its stowed position with end support 26a positioned on support element 18, as shown in FIG. 19. In this position the hook portion 122 of end support component 106 engages the opening 34 of the forward support element 18. In either instance, the user is able to unlock and lock both end supports 26a and 26b from the support elements 20 and 22 from one side of the vehicle 12. This eliminates the need for the user to walk back and forth between both sides of the vehicle 12 to accomplish repositioning of the rear cross bar 26, or when moving the rear cross bar 26 between its stowed and operative positions. This significantly adds to the ease and convenience in using manipulating the rear cross bar 26.

Figure 18:
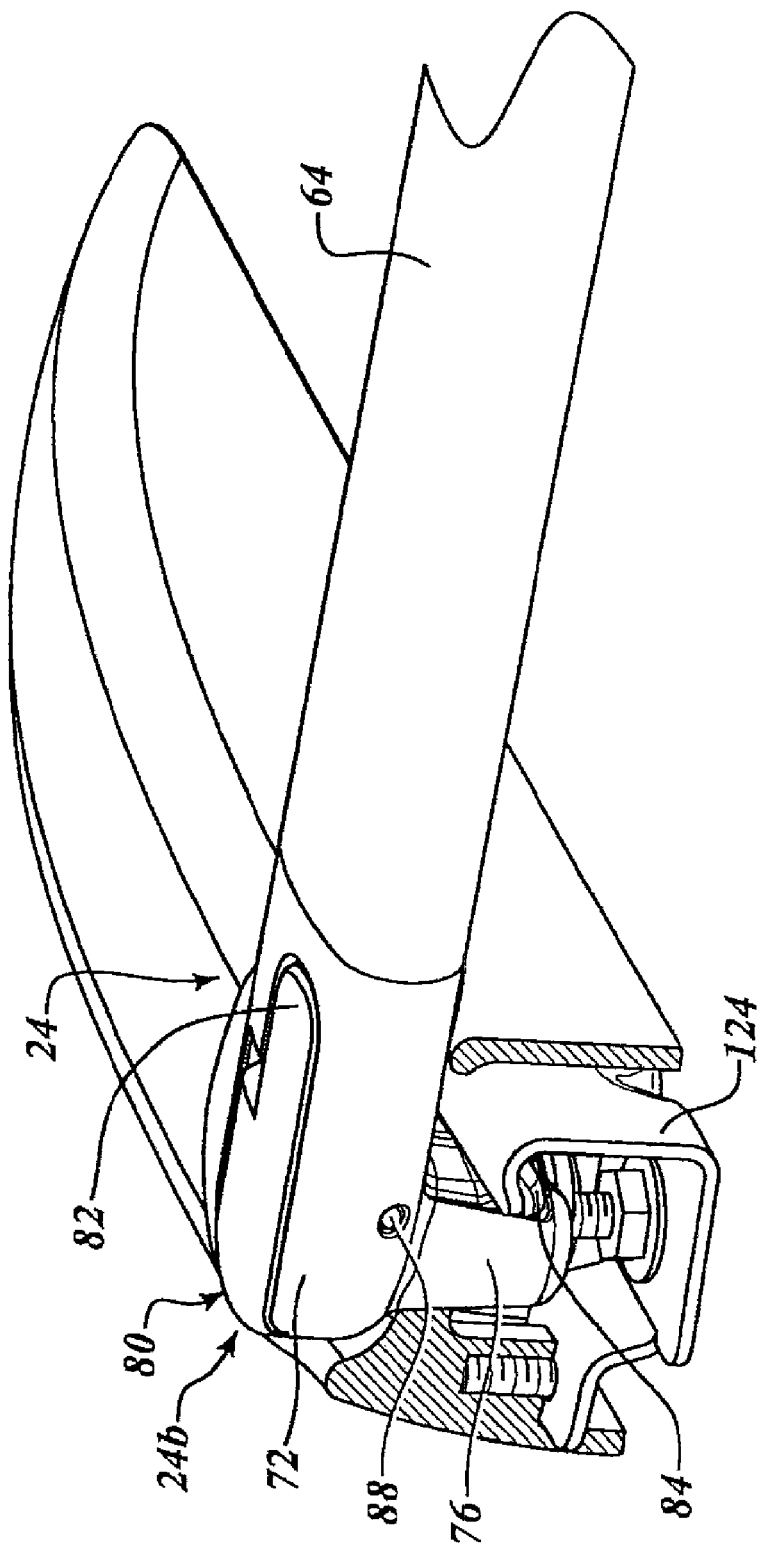
FIG. 18 is a perspective, cross sectional view of the second end support of the front cross bar engaged with the second one of the forward support elements.

Referring to FIG. 18, when the front cross bar 24 is in its operative position, jaw portion 84 of locking member 80 extends through the opening 34 in the support element 18 to engage with flange 130 of the bracket 124 (the flange 130 also being visible in FIG. 10). When the rear cross bar 26 is in its stowed position, the locking member 106 of end support 26a extends through opening 34 to engage the support element 18 (FIG. 19). In their stowed positions, the cross bars 24 and 26 form a sleek, aesthetically pleasing component that bridges support element pairs 16,20 and 18,22. Stowing the cross bars 24 and 26 also helps to even further improve the aerodynamic characteristics of the vehicle article carrier 10. A particular advantage is that stowing of the cross bars 24 and 26 can be accomplished without any disassembly of the end supports 24a,24b,26a and 26b from any of the support elements 16, 18, 20 and 22. Furthermore, no external tools are required to reposition the cross bars 24 and 26 in their stowed positioned or to move them from their stowed positions back into their operative positions.

From FIG. 3, it will also be apparent that in this example, the outer body surface 14 of the vehicle 12 is slightly wider at a forward portion of the vehicle 12a than at a rearward portion 12b. However, the channels 42 and 166 in the support elements 20 and 22, respectively, have been formed slightly non-parallel to outermost edges 200 and 202 of the rear support elements 20 and 22. This enables the support elements 20 and 22 to be mounted generally parallel to the longitudinal side edges of the outer body surface 14, while the channels 42 and 166 are maintained parallel to one another. The parallel positioning of the channels 42 and 166 enables the end supports 26a and 26b to be moved slidably along the channels 42 and 166 without binding. Furthermore, the slightly wider spacing of the forward support elements 16 and 18 means that the distance between the openings 28 and 34 will be slightly greater than the distance between the channels 42 and 166. To account for this, the overall length of the front cross bar 24 is just slightly longer than overall length of the rear cross bar 26. This also results in the longitudinal spacing between recess 28 in front support element 16 and opening 40 in the rear support element 20 being slightly greater than the spacing between the opening 34 in front support element 18 and the rearward most securing loop 176a. Of course, if the spacing between the front support elements 16,18 and the spacing between the rear support elements 20,22 is the same, then the overall lengths of the cross bars 24 and 26 may be the same, which would also obviate the need to make the spacing between the end support securing points on the support element pairs 16,20 and 18,22 different.

The end support components 98 and 140, as well as the locking members 106 and 150 may be made from high strength plastics or any other suitable strong and durable materials. The support elements 16-22 may also be made from high strength plastic, aluminum or any other suitably strong and durable materials.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier for supporting articles above an outer body surface of a vehicle, the apparatus comprising:
a pair of rear support elements fixedly secured to said outer body surface adjacent a rear portion of said outer body surface;
a pair of forward support elements fixedly secured to said outer body surface adjacent a forward portion of said outer body surface;
a rear cross bar pivotally attached at a second end to a second one of said rear support elements, and removably attached at a first end thereof to a first one of said rear support elements;
a forward cross bar having a first end pivotally secured at a first one of said forward supports elements, and removably attached at a second end thereof to a second one of said forward support elements;
said second end of said forward cross bar being movable from a position attached to said second one of said forward support elements, wherein said forward cross is positioned in an operative position extending between the pair of forward support elements, to a position wherein said first end of said forward cross bar is attached to said first one of said rear support elements such that said forward cross bar assumes a stowed position;
said first end of said rear cross bar being movable from a position attached to said first one of said rear support elements, wherein said rear cross bar is positioned in an operative position extending between said rear support elements, to a position wherein said first end of said rear cross bar is attached to said second one of said forward support elements such that said rear cross bar assumes a stowed position;
wherein one of said forward and rear cross bars is longitudinally positionable and securable at a plurality of predetermined, spaced apart locations along said rear support elements;
wherein one of said forward and rear cross bars includes a pair of pivotally mounted locking members and structure that enable its first and second ends to be simultaneously locked and unlocked through pivoting motions of said pivotally mounted locking members;
wherein said ends of said first and second cross bars that are pivotally movable are pivotally secured to their respective ones of said support elements in a fashion that prevents removal from their respective said support element; and wherein each of said rear support elements includes a plurality of longitudinally aligned, spaced apart securing loops for engaging with portions of said pivotally mounted locking members when said rear cross bar is in an operative position and secured to said rear support elements.

2. The apparatus of claim 1, wherein said second end of said forward cross bar includes an end support having a manually engageable locking member, and wherein said manually engageable locking member is pivotally supported relative to said end support and operatively associated with said structure.

3. The apparatus of claim 1, wherein said pair of pivotally mounted locking members are disposed on said first end and said second end of said rear cross, and wherein each of said pair of pivotally mounted locking members is manually engageable.

4. The apparatus of claim 1, wherein said first end of rear cross bar includes a first end support and said second end of said rear cross bar includes a second end support, each of said end supports including one of said pivotally mounted locking members, and said pivotally mounted locking members are intercoupled by said structure, and wherein said structure includes a cable; and
wherein both of said end supports can be locked to their respective said support elements by said locking members, and both of said end supports can be simultaneously unlocked from their respective end supports by manually engaging and moving either one of said locking members.

5. The apparatus of claim 1, wherein said first one of said forward support elements includes a slot enabling said forward cross bar to be pivoted away from said outer body surface prior to moving said forward cross bar between said operative and stowed positions.

6. The apparatus of claim 1, wherein each of said rear support elements includes a channel along which said rear cross bar may be slidably moved.

7. The apparatus of claim 1, wherein at least one of said rear support elements includes a plurality of spaced apart openings in a wall portion thereof for engaging with its respective said pivotally mounted locking member.

8. The apparatus of claim 4, further comprising a biasing element housed within said rear cross bar, and a block coupled to said cable, said biasing element acting on said cable to assist in maintaining both of said pivotally mounted locking members associated with said rear cross bar in locked positions.

9. A vehicle article carrier for supporting articles above an outer body surface of a vehicle, the apparatus comprising:
a pair of rear support elements fixedly secured to said outer body surface adjacent a rear portion of said outer body surface;
a pair of forward support elements fixedly secured to said outer body surface adjacent a forward portion of said outer body surface;
a rear cross bar pivotally attached at a second end to a second one of said rear support elements, and removably attached at a first end thereof to a first one of said rear support elements, and each of said first and second ends of said rear cross bar including a manually graspable locking member engageable by an individual and movable between locked and unlocked positions;
a forward cross bar having a first end pivotally secured at a first one of said forward supports elements, and removably attached at a second end thereof to a second one of said support elements;
said second end of said forward cross bar being pivotally movable from a position attached to said second one of said forward support elements, wherein said forward cross is positioned in an operative position, to a position attached to said first one of said rear support elements, wherein said forward cross assumes a stowed position;
said first end of said rear cross bar being pivotally movable from a position attached to said first one of said rear support elements, wherein said rear cross bar is positioned in an operative position, to a position attached to said second one of said forward support elements wherein said rear cross bar assumes a stowed position;
wherein one of said forward and rear cross bars includes pivotally mounted locking members at opposite ends, and is longitudinally positionable and securable at a plurality of spaced apart locations along said rear support elements;
wherein said pivotally mounted locking members can be simultaneously unlocked by moving either one of said pivotally mounted locking members, into its respective unlocked position;
wherein said ends of said first and second cross bars that are pivotally movable are pivotally secured to their respective ones of said support elements in a fashion that prevents removal from their respective said support element;
wherein each said rear cross bar comprises a first end support at said first end and a second end support at said second end, said first end support housing one of said pivotally mounted locking members and said second end support housing the other one of said pivotally mounted locking member; and
wherein at least one of said rear support elements includes a plurality of longitudinally spaced apart securing loops at which its respective said end support may be secured.

10. The apparatus of claim 9, wherein said pivotally mounted locking members are coupled by a cable extending through an interior area of said rear cross bar.

11. The apparatus of claim 9, wherein each said end support includes a biasing element for assisting in holding its respective said pivotally mounted locking member in a normally locked position.

12. The apparatus of claim 9, wherein said second one of said forward support elements and said first one of said rear support elements each include an opening enabling said forward cross bar to be secured to either one of second forward support element or said first rear support element.

13. A vehicle article carrier for supporting articles above an outer body surface of a vehicle, the apparatus comprising:
a pair of first support elements fixedly secured to said outer body surface adjacent a first portion of said outer body surface;
a pair of second support elements fixedly secured to said outer body surface adjacent a second portion of said outer body surface;
a first cross bar pivotally attached at a second end to a second one of said second support elements, and removably attached at a first end thereof to a first one of said second support elements;
a second cross bar having a first end pivotally secured at a first one of said first support elements, and removably attached at a second end thereof to a second one of said first support elements;
said first and second cross bars each being pivotally movable at one end thereof to enable said cross bars to be selectively secured to said first and second support elements to place said cross bars in an operative position, wherein said first cross bar extends between said first support elements, and said second cross bar extends between said second support elements;

said cross bars being pivotally moveable each from one end thereof to place said cross bars in stowed positions, wherein said cross bars are secured to said support elements such that said cross bars extend generally parallel to one another and parallel to a major longitudinal axis of said vehicle;

wherein one of said first and second cross bars includes a pair of pivotally mounted locking members at opposite ends thereof that are moveable simultaneously through movement of either one of said pivotally mounted locking members;

wherein said ends of said first and second cross bars that are pivotally movable are secured to their respective ones of said support elements in a fashion that prevents removal from their respective said support element; and wherein each of said first support elements includes a plurality of longitudinally aligned, spaced apart securing loops for engaging with portions of said pivotally mounted locking members when said first cross bar is in an operative position and secured to said first pair of support elements.

* * * * *